(12) United States Patent
Shou et al.

(10) Patent No.: US 10,168,989 B1
(45) Date of Patent: Jan. 1, 2019

(54) ADJUSTABLE EMPTY THRESHOLD LIMIT FOR A FIRST-IN-FIRST-OUT (FIFO) CIRCUIT

(71) Applicant: Altera Corporation, San Jose, CA (US)

(72) Inventors: Jinhun Shou, Cupertino, CA (US); Gary Wallichs, San Jose, CA (US)

(73) Assignee: Altera Corporation, San Jose, CA (US)

( * ) Notice: Subject to any disclaimer, the term of this patent is extended or adjusted under 35 U.S.C. 154(b) by 234 days.

(21) Appl. No.: 14/964,355

(22) Filed: Dec. 9, 2015

(51) Int. Cl.
| G06F 13/00 | (2006.01) |
| G06F 5/14  | (2006.01) |
| G06F 13/42 | (2006.01) |
| G06F 5/06  | (2006.01) |

(52) U.S. Cl.
CPC .............. *G06F 5/14* (2013.01); *G06F 5/065* (2013.01); *G06F 13/4226* (2013.01); *G06F 13/4291* (2013.01); *G06F 2205/067* (2013.01); *G06F 2205/126* (2013.01)

(58) Field of Classification Search
None
See application file for complete search history.

(56) References Cited

U.S. PATENT DOCUMENTS

| 5,687,348 | A  | * | 11/1997 | Whittaker | ............ | G06F 12/0831 |
|           |    |   |         |           |              | 711/133      |
| 7,313,643 | B2 | * | 12/2007 | Sakurai   | ................. | G06F 13/385 |
|           |    |   |         |           |              | 710/315      |
| 2007/0220367 | A1 | * | 9/2007 | Smith | .................... | G06F 11/184 |
|           |    |   |         |           |              | 714/48       |
| 2008/0140159 | A1 | * | 6/2008 | Bornhoft | .............. | A61B 5/0006 |
|           |    |   |         |           |              | 607/60       |
| 2009/0115740 | A1 | * | 5/2009 | Ningrat | ................. | G06F 3/0416 |
|           |    |   |         |           |              | 345/173      |
| 2017/0149554 | A1 | * | 5/2017 | Gendler | ................ | H04L 7/0025 |

OTHER PUBLICATIONS

"Avalon Interface Specifications," Altera Corporation, Mar. 2015, pp. 1-58.
Clifford E. Cummings, "Simulation and Synthesis Techniques for Asynchronous FIFO Design," Sunburst Design, Inc., SNUG San Jose 2002, pp. 1-23.
Clifford E. Cummings, "Simulation and Synthesis Techniques for Asynchronous FIFO Design with Asynchronous Pointer Comparisons," Sunburst Design, Inc., SNUG San Jose 2002, pp. 1-18.

\* cited by examiner

*Primary Examiner* — Hyun Nam

(57) ABSTRACT

In one embodiment, transceiver circuitry includes a first-in-first-out (FIFO) circuit and a control logic circuit. The FIFO circuit receives data signals based on a first clock frequency and outputs stored data signals based on a second clock frequency. The stored data signals are transmitted out of the FIFO circuit only in response to a difference between a value of a write pointer of the FIFO circuit and a value of a read pointer of the FIFO circuit exceeding an empty threshold limit of the FIFO circuit. The control logic circuit may be utilized to adjust the empty threshold limit of the FIFO circuit.

20 Claims, 6 Drawing Sheets

US 10,168,989 B1

ADJUSTABLE EMPTY THRESHOLD LIMIT FOR A FIRST-IN-FIRST-OUT (FIFO) CIRCUIT

FIELD OF THE DISCLOSURE

The present disclosure relates to electronic circuits, and more particularly, to adjustable empty threshold limits for FIFO circuits.

BACKGROUND

There are many means for an integrated circuit device to communicate with another integrated circuit device. One of the communication means is Peripheral Component Interconnect Express (PCI Express/PCIe). PCI Express is a high-speed serial bus standard that enables an integrated circuit device to communicate externally via a connection called a link. A link is a point-to-point communication channel between ports of two integrated circuit devices that communicate using the PCI Express protocol. The link allows both of these devices to transmit and receive signals.

Circuits that implement the functions of PCI Express operate at a clock frequency that depends on the link, whereas the circuit fabric of the integrated circuit device operates based on its own internal clock frequency.

Therefore, an asynchronous first-in-first-out (FIFO) register is placed as an interface circuit between the fabric and the circuits that implement functions of PCI Express. The asynchronous FIFO enables the transmission of data signals from a fabric clock frequency domain to a PCI Express clock frequency domain.

Further, the link speed of a PCI Express link may be negotiated quite frequently. The link speed negotiation occurs when demanded by an external device coupled to the PCI Express device. Each time the link speed is negotiated, the PCI Express device is placed in an idle mode to allow itself a recovery. Generally, the idle mode is for a long period and may affect data transmission throughputs of the PCI Express device.

SUMMARY

Embodiments described herein include an adjustable empty threshold limit for a FIFO circuit and methods of transmitting data through the FIFO circuit. It should be appreciated that the embodiments can be implemented in numerous ways, such as a process, an apparatus, a system, a device, or a method. Several embodiments are described below.

In one embodiment, transceiver circuitry includes a first-in-first-out (FIFO) circuit and a control logic circuit. The FIFO circuit stores data received at a first clock frequency rate and outputs the stored data at a second clock frequency rate. The stored data may start to transmit out from the FIFO circuit only in response to a difference between a value of a write pointer of the FIFO circuit and a value of a read pointer of the FIFO circuit exceeding an empty threshold limit of the FIFO circuit. The control logic circuit may be utilized to adjust the empty threshold limit for the FIFO circuit.

In another embodiment, a method of transmitting data through transceiver circuitry includes a step to receive first and second clock signals at a FIFO circuit. The FIFO circuit may have a first empty threshold limit. In one embodiment, the first clock signal is at a fixed clock frequency value, and the second clock signal changes from a first clock frequency value to a second clock frequency value. The method also includes a step to change the first empty threshold limit value to a second empty threshold limit value for the FIFO circuit using a control circuit in response to the second clock signal changing from the first clock frequency value to the second clock frequency value.

In an alternative embodiment, a method of transmitting a data through transceiver circuitry coupled to external circuitry includes a step to receive first and second clock signals at a FIFO circuit. The first clock signal may be at a first clock frequency value and the second clock signal may be at a second clock frequency value. In one embodiment, the second clock signal changes its frequency value depending on the external circuitry. The method also includes a step to generate an empty threshold limit value for the FIFO circuit based on a difference between the first and second clock frequency values using a control circuit.

Further features of the invention, its nature and various advantages will be more apparent from the accompanying drawings and the following detailed description of the preferred embodiments.

DETAILED DESCRIPTION

The following includes an adjustable minimum threshold limit for a first-in-first-out (FIFO) circuit and methods of transmitting data through the FIFO circuit. It should be understood that the present exemplary embodiments may be practiced without some or all of these specific details. In other instances, well-known operations have not been described in detail in order not to unnecessarily obscure the present embodiments.

Throughout this specification, when an element is referred to as being "connected" or "coupled" to another element, it may be directly connected or coupled to the other element or electrically connected or coupled to the other element with yet another element interposed between them.

Figure 1:
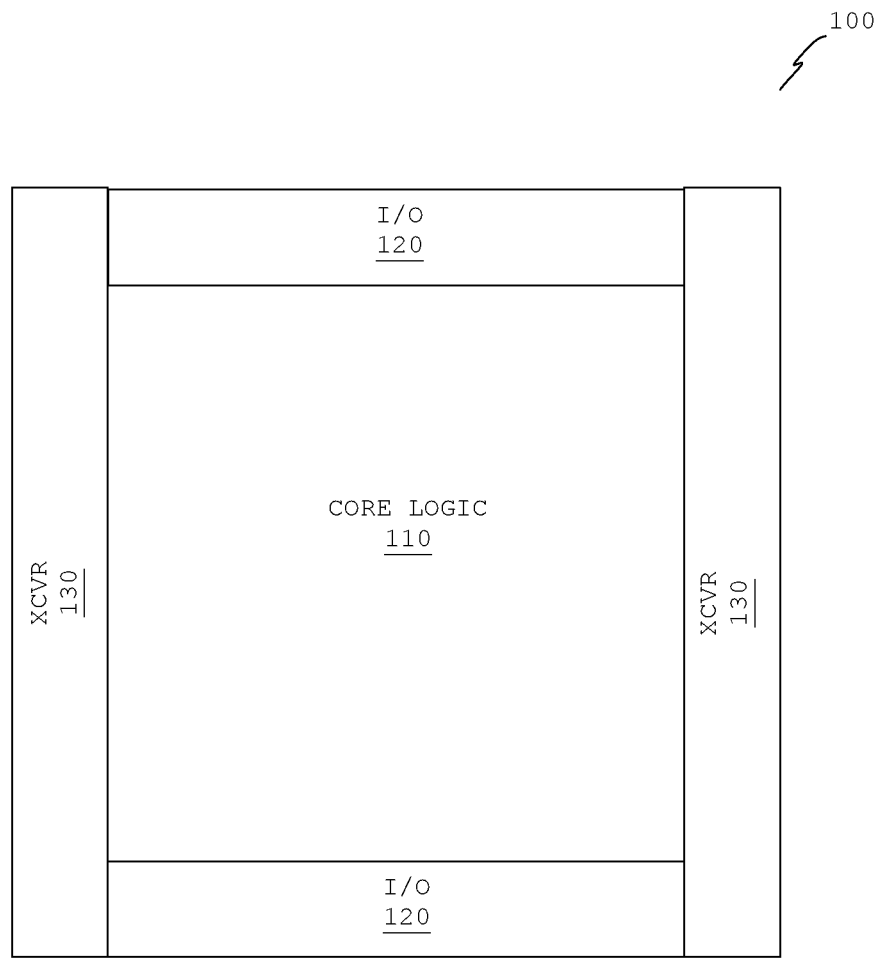
FIG. 1 shows an illustrative integrated circuit in accordance with one embodiment of the present invention.

FIG. 1, meant to be illustrative and not limiting, illustrates an integrated circuit in accordance with one embodiment of the present invention. Integrated circuit 100 includes core logic 110 and input/output (I/O) circuits 120 and transceiver (XCVR) circuits 130.

In one embodiment, integrated circuit 100 may be an application specific integrated circuit (ASIC) device, an application standard specific product (ASSP) device, a programmable logic device (PLD) or a microprocessor device. In general, ASIC and ASSP devices may perform fixed and dedicated functions. PLD devices may be programmable to perform a variety of functions. An example of a PLD device may be a field programmable gate array (FPGA) device.

Integrated circuit 100 may be used in different types of high speed systems, for example a communication system such as wireless systems, wired systems, etc. In one embodiment, integrated circuit 100 may be a PLD that is utilized for controlling data transfer between different devices, for example, a microprocessor device and a memory device. Hence, integrated circuit 100 may include circuits that may be used to implement various transmission standards that allow integrated circuit 100 to communicate with external devices such as memory devices (not shown) that may be coupled to integrated circuit 100.

Referring still to FIG. 1, I/O circuits 120 and transceiver circuits 130 occupy the peripheral portion of integrated circuit 100, and core logic 110 occupies the center region of integrated circuit 100. It should be appreciated that the arrangement of I/O circuits 120, transceiver circuits 130 and core logic 110 on integrated circuit 100 may vary depending on the requirements of a particular device.

In one embodiment, core logic 110 may be utilized for performing core functions of integrated circuit 100. Core logic 110 may include specific circuitry for the functions that define integrated circuit 100. For example, core logic 110 may include circuits that perform memory device addressing and processing of information retrieved from the memory device when integrated circuit 100 is used as a memory controller. In another example, core logic 110 may include programmable logic elements when integrated circuit 100 is a PLD. The programmable logic elements may further include circuits such as look-up table circuitry, multiplexers, product-term logic, registers, memory circuits and the like. The programmable logic elements may be programmed by a user (e.g., a designer or an engineer) to perform desired functions.

I/O circuits 120 and transceiver circuits 130 may be utilized for transferring signals (i.e., data) into or out of integrated circuit 100. For example, signals from core logic 110 may be transferred out of integrated circuit 100 through either one of the I/O circuits 120 or transceiver circuits 130. Additionally, signals received from an external device (external to integrated circuit 100) may be transferred to core logic 110 through one of the I/O circuits 120 or transceiver circuits 130. In one embodiment, I/O circuits 120 and transceiver circuits 130 may be considered as external interfacing circuitry of integrated circuit 100. Signals may be transferred out or received by one of the I/O circuits 120 or transceiver circuits 130 via its pins (not shown).

Integrated circuit 100 may transmit signals or receive signals using various data transfer protocols. In one embodiment, integrated circuit 100 may transmit signals by way of a Peripheral Component Interconnect (PCI) Express protocol (also referred as "PCIe"). To enable integrated circuit 100 to transmit using the PCI Express protocol, transceiver circuits 130 may include specific circuits to transmit signals by way of the PCI Express protocol.

Figure 2:
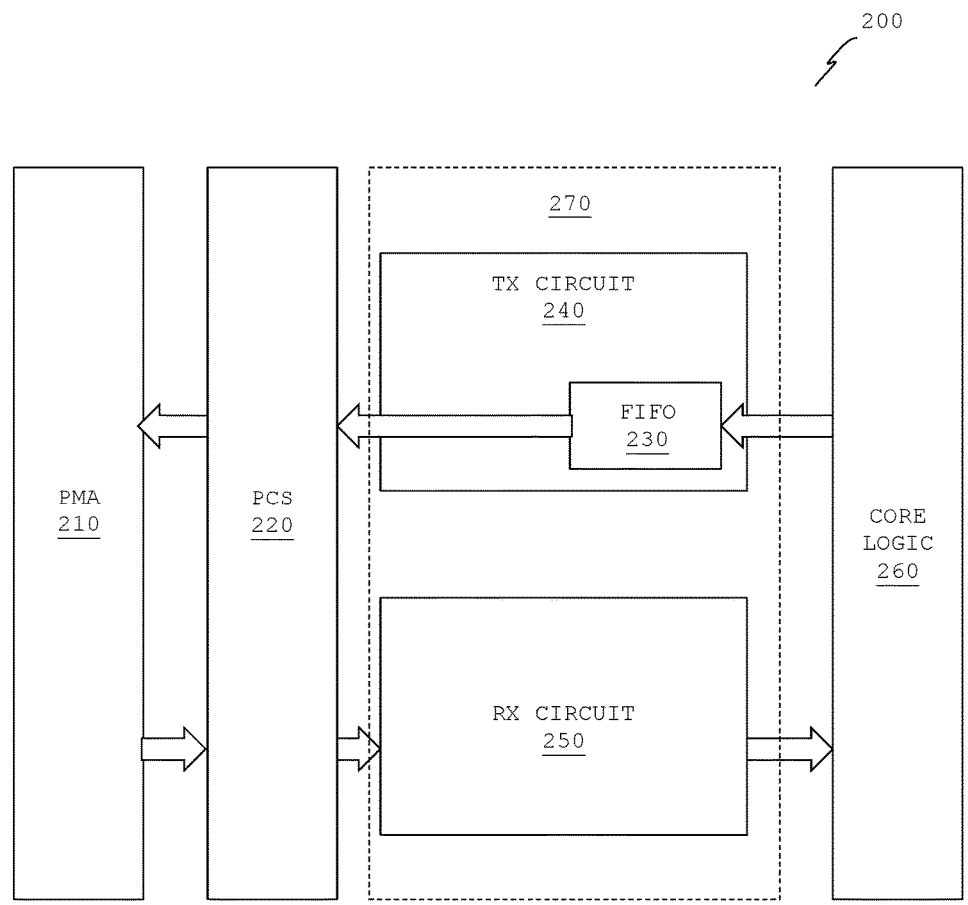
FIG. 2 shows an illustrative integrated circuit (IC) with PCI Express according to an embodiment of the present invention.

FIG. 2, meant to be illustrative and not limiting, illustrates an integrated circuit (IC) with transceiver circuits that use the PCI Express protocol according to an embodiment of the present invention. In the embodiment of FIG. 2, integrated circuit (IC) die 200 includes physical media attachment (PMA) layer circuitry 210, physical coding sublayer (PCS) circuitry 220, adapter circuit 270 and core logic 260. In one embodiment, core logic 260 may be similar to core logic 110 of FIG. 1. PMA layer circuitry 210, PCS circuitry 220 and adapter circuit 270 may be within transceiver circuits 130 of FIG. 1.

PMA circuitry 210 and PCS circuitry 220 may include multiple sub-circuits (not shown). For example, PMA circuitry 210 may include a clock data recovery (CDR) circuit. PCS circuitry 220 may include a state machine (SM) circuit. The CDR circuit, within PMA circuitry 210, may further include a phase-locked loop circuit.

Adapter circuit 270 includes transmitter (TX) circuit 240 and receiver (RX) circuit 250. Transmitter circuit 240 and receiver circuit 250 may include multiple sub-circuits (most of these sub-circuits are not shown). For example, transmitter circuit 240 may include, but is not limited to, a clock selector circuit, a reset state machine circuit, and a FIFO circuit 230. Transmitter circuit 240 may also include other circuits. FIFO circuit 230 is a sub-circuit that is shown in the embodiment of FIG. 2. In one embodiment, FIFO circuit 230 may be an asynchronous FIFO. FIFO circuit 230 may include multiple storage elements that store received data. Receiver circuit 250 may include, but is not limited to, a clock selector circuit, a reset state machine circuit, a FIFO circuit, and an automatic speed negotiation (ASN) state machine circuit. In an alternative embodiment, the ASN state machine circuits may be included in transmitter circuit 240. Core logic 260 may include circuitry that performs functions of the media access control (MAC) sublayer of PCI Express.

Figure 3:
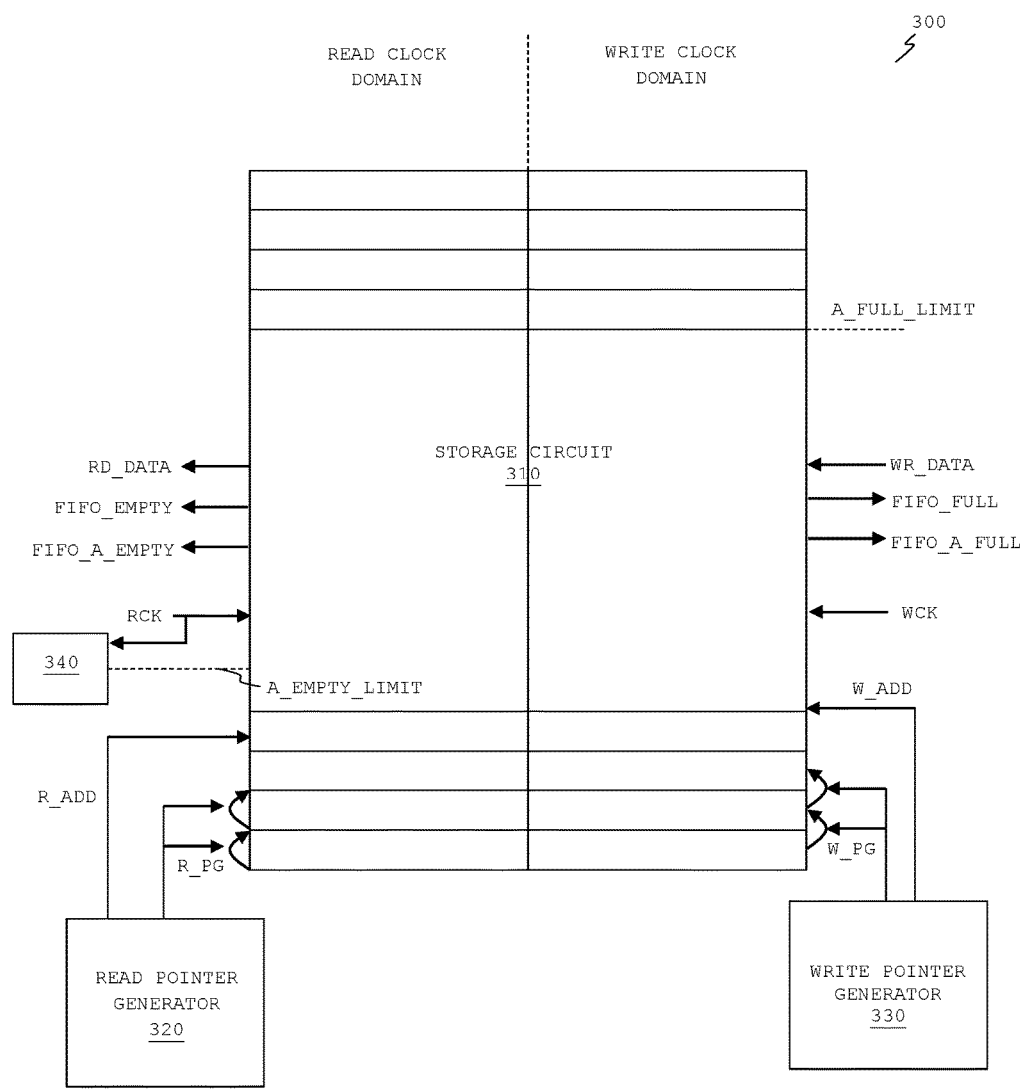
FIG. 3 shows an illustrative first-in first-out (FIFO) circuit in accordance with one embodiment of the present invention.

FIG. 3, meant to be illustrative and not limiting, illustrates a FIFO circuit in accordance with one embodiment of the present invention. In one embodiment, FIFO circuit 300 may be FIFO circuit 230 of FIG. 2. FIFO circuit 300 includes storage circuit 310, write pointer generator circuit 330, read pointer generator circuit 320, and FIFO empty logic 340. Read and write pointer generator circuits 320 and 330 are coupled to storage circuit 310. FIFO empty logic 340 may generate an empty threshold limit value, which is compared with a read pointer generated by read pointer generator circuit 320 to ascertain whether FIFO circuit 300 is ready to transmit out the stored data from storage circuit 310.

FIFO circuit 300 may be formed in any type of integrated circuit, such as an FPGA or an ASIC. FIFO circuit 300 may, for example, be formed using programmable logic circuits in an FPGA, using non-programmable circuits in an FPGA or ASIC, or any combination of programmable circuits and non-programmable circuits.

FIFO circuit 300 is a dual clock FIFO circuit that provides data from a write clock domain to a read clock domain. Timing circuits in the write clock domain are clocked by a write clock signal (WCK). Timing circuits in the read clock domain are clocked by a read clock signal (RCK). In some embodiments, the WCK signal has a different frequency value and a different period than the RCK signal. Some circuits cannot transmit data between two different clock domains having two different clock frequency values without generating errors in the data. FIFO circuit 300 can provide the data from the write clock domain to the read clock domain without generating errors in the data.

During the operation of FIFO circuit 300, write data indicated by one or more write data signals (WR_DATA) are provided to one or more write data inputs of storage circuit 310. The WR_DATA signals may include only one signal or multiple signals. When the WR_DATA signals include multiple signals, the WR_DATA signals are provided in parallel to a corresponding number of write data inputs of storage circuit 310. As an example, the WR_DATA signals may indicate a word of write data. Each word of write data may have any number of parallel digital bits (for example, 8, 16, 24, 32, 48, or 64 bits) indicated by an equal number of parallel WR_DATA signals.

Write pointer generator circuit 330 generates a write address for each data word indicated by the WR_DATA signals. Each data word of the WR_DATA signals is stored in storage circuit 310 at the corresponding write address. The write address is provided to storage circuit 310. Write pointer generator circuit 330 generates one or more write address signals (W_ADD) that indicates a write address in response to the WCK signal. The output from write pointer generator circuit 330 may be synchronized with the WCK signal. If write pointer generator circuit 330 generates two or more W_ADD signals to indicate each write address, the W_ADD signals are provided in parallel as multiple parallel address bits to write address inputs of storage circuit 310.

Write pointer generator circuit 330 may contain any suitable circuitry that generates the write addresses. As an example, storage circuit 310 may have several storage locations that are identified by numerically consecutive addresses, and write pointer generator circuit 330 may include a counter circuit that generates numerically consecutive write addresses that increase by 1 (or decrease by 1) in each period of the WCK signal. As another example, storage circuit 310 may have storage locations that are identified by non-consecutive addresses, and write pointer generator circuit 330 may generate non-consecutive write addresses. The write addresses generated by write pointer generator circuit 330 may be, for example, encoded using binary encoding, encoded with Gray codes, or encoded using another encoding technique.

Storage circuit 310 may be any suitable type of storage circuit. For example, storage circuit 310 may be a random access memory (RAM), such as static RAM or dynamic RAM. As another example, storage circuit 310 may include register circuits, such as flip-flop circuits. As another example, storage circuit 310 may include flash memory or another type of non-volatile memory.

Each word of write data indicated by the WR_DATA signals is stored in storage circuit 310 at a storage location that is identified by a corresponding write address indicated by the W_ADD signals. Storage circuit 310 stores the words of write data in response to the WCK signal. Storage circuit 310 may include several storage locations. Each storage location in storage circuit 310 contains enough storage space to store a word of data. Each unique storage location in storage circuit 310 is identified by a unique address.

In an embodiment, the first word of write data received by way of the WR_DATA signals is stored in the first storage location in storage circuit 310. Each word of write data subsequently received by way of the WR_DATA signals are stored in the next storage location identified by the next write address in storage circuit 310, until write data has been stored in all of the storage locations in storage circuit 310. After a word of write data has been stored in the last storage location in storage circuit 310, the next word of write data received in the WR_DATA signals is stored in the first storage location in storage circuit 310, and then the process described with respect to this embodiment repeats.

As an example that is provided for illustration and is not intended to be limiting, if storage circuit 310 has 128 storage locations that are identified by addresses 0-127, the first word of write data received in the WR_DATA signals is stored in the storage location at address 0, the second word of write data received in the WR_DATA signals is stored in the storage location at address 1, the third word of write data received in the WR_DATA signals is stored in the storage location at address 2, etc. The 4th through the 128th words of write data received in the WR_DATA signals are stored in the storage locations at addresses 3-127, respectively, in storage circuit 310. After the 128th word of write data is stored in the storage location at address 127, the 129th word of write data received in the WR_DATA signals is stored in the storage location at address 0. The 130th-256th words of write data received in the WR_DATA signals are consecutively stored in the storage locations at addresses 1-127, respectively, in storage circuit 310. The 257th word of write data received in the WR_DATA signals is stored in the storage location at address 0 in storage circuit 310, and then this process continues to repeat.

During the operation of FIFO circuit 300, storage circuit 310 outputs one or more read data signals (RD_DATA) that indicate read data. The one or more RD_DATA signals are provided from one or more read data outputs of storage circuit 310. The read data may be indicated by only one RD_DATA signal or by multiple RD_DATA signals. If the read data is indicated by multiple RD_DATA signals, the RD_DATA signals are output in parallel from an equal number of read data outputs of storage circuit 310. As an example, the RD_DATA signals may indicate a word of read data. Each word of read data may have any number of parallel digital bits (for example, 8, 16, 24, 32, 48, or 64 bits) indicated by an equal number of parallel RD_DATA signals. In an embodiment, each word of read data may have the same number of parallel bits as each word of the write data. In another embodiment, one or more RD_DATA signals may indicate serial read data bits, and one or more WR_DATA signals may indicate serial write data bits.

Read pointer generator circuit 320 generates a read address for each word of read data to be read from storage circuit 310. The read address is provided to storage circuit 310. Read pointer generator circuit 320 generates one or more read address signals (R_ADD) that indicate the read address for each word of read data in response to read clock signal RCK. Each word of read data is read from storage circuit 310 at the read address indicated by the R_ADD signals generated for that word of read data. Read pointer generator circuit 320 is synchronized with the RCK signal. The R_ADD signals are provided to one or more read address inputs of storage circuit 310. If read pointer generator circuit 320 generates two or more R_ADD signals to indicate each read address, the R_ADD signals for each read address are provided in parallel as multiple parallel address bits to multiple read address inputs of storage circuit 310.

Read pointer generator circuit 320 may contain any suitable circuitry that generates the read addresses. As an example, read pointer generator circuit 320 may include a counter circuit that generates numerically consecutive values for the read addresses in response to the RCK signal. The numerically consecutive values for the read addresses may, for example, increase by 1 (or decrease by 1) in each period of the RCK signal. If storage circuit 310 has storage locations that are identified by non-consecutive addresses, read pointer generator circuit 320 may generate non-consecutive values for the read addresses. The read addresses generated by read pointer generator circuit 320 may be, for example, encoded using binary encoding, encoded with Gray codes, or encoded with another suitable encoding technique. In an embodiment, both the read and write addresses are encoded using the same encoding technique, for example, binary encoding.

In response to each read address generated in the R_ADD signals, storage circuit 310 accesses the word of data stored in the storage location that is identified by the read address indicated by the R_ADD signals in response to the RCK signal. The word of data accessed from the storage location of storage circuit 310 at the read address indicated by the R_ADD signals is output from storage circuit 310 as the read data. Storage circuit 310 causes the RD_DATA signals to indicate the word of read data stored in the storage location that is identified by the read address indicated by the R_ADD signals. Storage circuit 310 outputs the RD_DATA signals in response to the RCK signal.

During the operation of FIFO circuit 300, words of data are read from storage circuit 310 in the same order that the words of data were stored in storage circuit 310. Using the example described above in which storage circuit 310 has 128 storage locations that are identified by addresses 0-127, the first word of read data provided as the RD_DATA signals is read from the storage location at address 0, the second word of read data provided as RD_DATA signals is read from the storage location at address 1, the third word of read data provided as RD_DATA signals is read from the storage location at address 2, etc. The 4th through the 128th words of read data provided as RD_DATA signals are read from the storage locations at addresses 3-127, respectively, in storage circuit 310. After the 128th word of read data is read from the storage location at address 127, the 129th word of read data is provided from the storage location at address 0 in storage circuit 310 as RD_DATA signals. The 130th-256th words of read data provided as the RD_DATA signals are consecutively read from the storage locations at addresses 1-127, respectively, in storage circuit 310. The 257th word of read data is read from the storage location at address 0 in storage circuit 310, and then this process continues to repeat. These examples are provided for illustration and are not intended to be limiting.

Write pointer generator circuit 330 also generates write pointer signals (W_PG) that indicate a write pointer. Write pointer generator circuit 330 generates the W_PG signals in response to the WCK signal. Write pointer generator circuit 330 causes the W_PG signals to be synchronized with the WCK signal. The write pointer indicates the same write address that is concurrently indicated by the W_ADD signals. Thus, both the W_ADD signals and the W_PG signals indicate the address of the storage location where a word of write data was last or is currently being stored in storage circuit 310. As an example, write pointer generator circuit 330 may generate the W_PG signals using the same counter circuit used to generate the W_ADD signals. In an exemplary embodiment, the W_ADD signals and the W_PG signals are the same signals.

The write pointer indicated by the W_PG signals may be, for example, encoded in binary, encoded with Gray codes, or encoded with another suitable encoding technique. The write pointer indicated by the W_PG signals may be encoded with the same encoding technique or with a different encoding technique relative to the write address indicated by the W_ADD signals. As an example, the write address indicated by the W_ADD signals may be binary encoded, and the write pointer indicated by the W_PG signals may be encoded using Gray codes, if W_ADD signals and W_PG signals are two different sets of signals. As another example, both the write address indicated by the W_ADD signals and the write pointer indicated by the W_PG signals may be binary encoded.

The W_PG signals are utilized by multiple circuits (not shown) within FIFO circuit 300. In one embodiment, the W_PG signals may be utilized to indicate the last storage location that a data word in the WD_DATA signals was stored within storage circuit 310. As described above, the last storage location address may be similar to the write address indicated by the W_ADD signals. In another embodiment, the W_PG signals may be utilized to determine if the storage circuit 310 is almost full. This determination may be performed by comparing the write pointer indicated in the W_PG signals with an almost full limit (A_FULL_LIMIT) of storage circuit 310. When the write pointer reaches the A_FULL_LIMIT, a FIFO almost full signal (FIFO_A_FULL) may be asserted. In addition to that, the W_PG signals may also be utilized to determine if storage circuit 310 is full. The W_PG signals may determine that storage circuit 310 is full when the write pointer indicated by the W_PG signals is pointing to the last address of storage circuit 310. When the write pointer reaches the last address for storage circuit 310, a FIFO full signal (FIFO_FULL) is asserted. It should be appreciated that the FIFO_A_FULL signal and the FIFO_FULL signal protect FIFO circuit 300 from continuously receiving new write data through the WR_DATA signals, and therefore preventing an overflow of FIFO circuit 300.

Read pointer generator circuit 320 also generates read pointer signals (R_PG) that indicate a read pointer. Read pointer generator circuit 320 generates the R_PG signals in response to the RCK signal. Read pointer generator circuit 320 causes the R_PG signals and the read pointer indicated by the R_PG signals to be synchronized with the RCK signal. The read pointer indicates the same read address that is concurrently indicated by the R_ADD signals. Thus, both the read address and the read pointer indicate the address of the storage location where a word of read data was last or is currently being accessed from storage circuit 310. As an example, read pointer generator circuit 320 may generate the R_PG signals using the same counter circuit used to generate the R_ADD signals. In an exemplary embodiment, the R_PG signals and R_ADD signals are the same set of signals.

The read pointer indicated by the R_PG signals may be, for example, binary encoded, encoded with Gray codes, or encoded with another suitable encoding technique. In some embodiments, the read pointer indicated by the R_PG signals is encoded using the same encoding technique as the write pointer indicated by the W_PG signals. For example, the read pointer and the write pointer may both be binary encoded.

The read pointer indicated by the R_PG signals may be encoded with the same encoding technique or with a different encoding technique relative to the read address indicated by the R_ADD signals. As an example, the read address indicated by the R_ADD signals may be encoded using binary encoding, and the read pointer indicated by the R_PG signals may be encoded using Gray codes, if the R_ADD signals and the R_PG signals are different sets of signals. As another example, both the read address indicated by the R_ADD signals and the read pointer indicated by the R_PG signals may be encoded using binary encoding.

The R_PG signals are utilized by multiple circuits (not shown) within FIFO circuit 300. In one embodiment, the read pointer indicated by the R_PG signals indicates a memory location within storage circuit 310 that was just accessed and read. The memory location may be similar to the read address indicated by the R_ADD signals.

FIFO circuit 300 generates a FIFO empty signal (FIFO_EMPTY). The FIFO_EMPTY signal is at a logic high value when storage circuit 310 is empty (i.e., no stored read data available to be transmitted through the RD_DATA signals). FIFO circuit 300 de-asserts the FIFO_EMPTY signal to indicate that storage circuit 310 is no longer empty.

In an embodiment, an empty threshold limit value may be utilized to determine if storage circuit 310 has a sufficient amount of read data in order to start the transmission of the read data through the RD_DATA signals. In order to determine whether there is a sufficient amount of read data stored in storage circuit 310, FIFO circuit 300 first compares the read pointer to the write pointer to determine the difference between the values of the write and read pointers. FIFO circuit 300 then compares the difference between the write and read pointers to the empty threshold limit value. The empty threshold limit value is indicated by a set of A_EMPTY_LIMIT signals. The empty threshold limit value indicates when FIFO circuit 300 is almost empty. FIFO circuit 300 determines when the difference between the value of the write pointer and the value of the read pointer is greater than the empty threshold limit value that is indicated by signals A_EMPTY_LIMIT. When the difference between the write and read pointers is greater than the empty threshold limit value, FIFO circuit 300 de-asserts a FIFO almost empty signal FIFO_A_EMPTY from a logic high value to a logic low value to indicate that storage circuit 310 has stored a sufficient amount of data in order to start transmitting the data through the RD_DATA signals.

In one embodiment, a read word is transmitted out as the RD_DATA signals when the FIFO_A_EMPTY signal is de-asserted. FIFO circuit 300 provides data that is stored in storage circuit 310 to its data outputs in signals RD_DATA in response to the difference between the value of the write pointer and the value of the read pointer exceeding the empty threshold limit value of FIFO circuit 300 as indicated by signals A_EMPTY_LIMIT. It should be appreciated that such a requirement is imposed in order to help to ensure there is enough read data accumulated within storage circuit 310 to avoid a read data underflow of FIFO circuit 300.

Referring still to FIG. 3, the empty threshold limit value of FIFO circuit 300 as indicated by signals A_EMPTY_LIMIT may vary depending on the clock frequency value of the RCK signal (provided the clock frequency value of the WCK signal is fixed). Alternatively, the empty threshold limit value of FIFO circuit 300 as indicated by signals A_EMPTY_LIMIT may be varied depending on the difference between the clock frequency values of the RCK and WCK signals.

The empty threshold limit value of FIFO circuit 300 as indicated by signals A_EMPTY_LIMIT may be generated by FIFO empty logic 340. In one exemplary embodiment, a relatively large empty threshold limit value of FIFO circuit 300 may be generated by FIFO empty logic 340 in signals A_EMPTY_LIMIT when the clock frequency value for the RCK signal is relatively high. Alternatively, a relatively small empty threshold limit value of FIFO circuit 300 may be generated by FIFO empty logic 340 in signals A_EMPTY_LIMIT when the clock frequency value of the RCK signal is relatively low.

It should be appreciated that the clock frequency value of the RCK signal may vary, for example, in response to changes in the data rate of data transmitted through the PCI Express link. When the clock frequency value of the RCK signal is varied, a new empty threshold limit value of FIFO circuit 300 is generated by FIFO empty logic 340 in signals A_EMPTY_LIMIT. In one exemplary embodiment, a larger empty threshold limit value of FIFO circuit 300 compared to the initial empty threshold limit value may be generated by FIFO empty logic 340 in signals A_EMPTY_LIMIT when the clock frequency value for the RCK signal increases from its initial clock frequency value. Alternatively, a smaller empty threshold limit value of FIFO circuit 300 compared to the initial empty threshold limit value may be generated by FIFO empty logic 340 in signals A_EMPTY_LIMIT when the clock frequency value for the RCK signal decreases further from its initial clock frequency value. FIFO empty logic 340 receives the RCK signal as an input.

It should be appreciated that FIFO empty logic 340 may vary the empty threshold limit value of FIFO circuit 300 at the initial stage of the read data signals RD_DATA transmission or while the read data signals RD_DATA are being transmitted.

FIFO empty logic 340 may be a control circuit, such as a state machine, in one embodiment. FIFO empty logic 340 may generate the empty threshold limit value of FIFO circuit 300 based on multiple factors including: (i) the number of clock cycles required to transmit read data through the RD_DATA signals, (ii) a clock cycle ratio between the RCK and WCK signals, and (iii) the size of the read and write data.

According to further embodiments, FIFO circuit 300 may have additional circuitry that performs other functions using the read and write pointers. For example, FIFO circuit 300 may include circuitry that subtracts the read pointer from the write pointer to determine the difference between the value of the write pointer and the value of the read pointer (i.e., the write pointer minus the read pointer). The read pointer may be subtracted from the write pointer in the read clock domain or in the write clock domain. In general, circuits performing arithmetic functions using the read and write pointers are less complex if the read and write pointers are both binary encoded. In some embodiments of FIFO circuit 300, the read and write pointers are binary encoded. The read and write pointers may include additional bits to indicate when reading and writing, respectively, has moved from the last storage location in storage circuit 310 back to the first storage location in storage circuit 310. According to other embodiments, FIFO circuit 300 may generate pointers that indicate when storage circuit 310 is partially full and when storage circuit 310 is partially empty.

Figure 4:
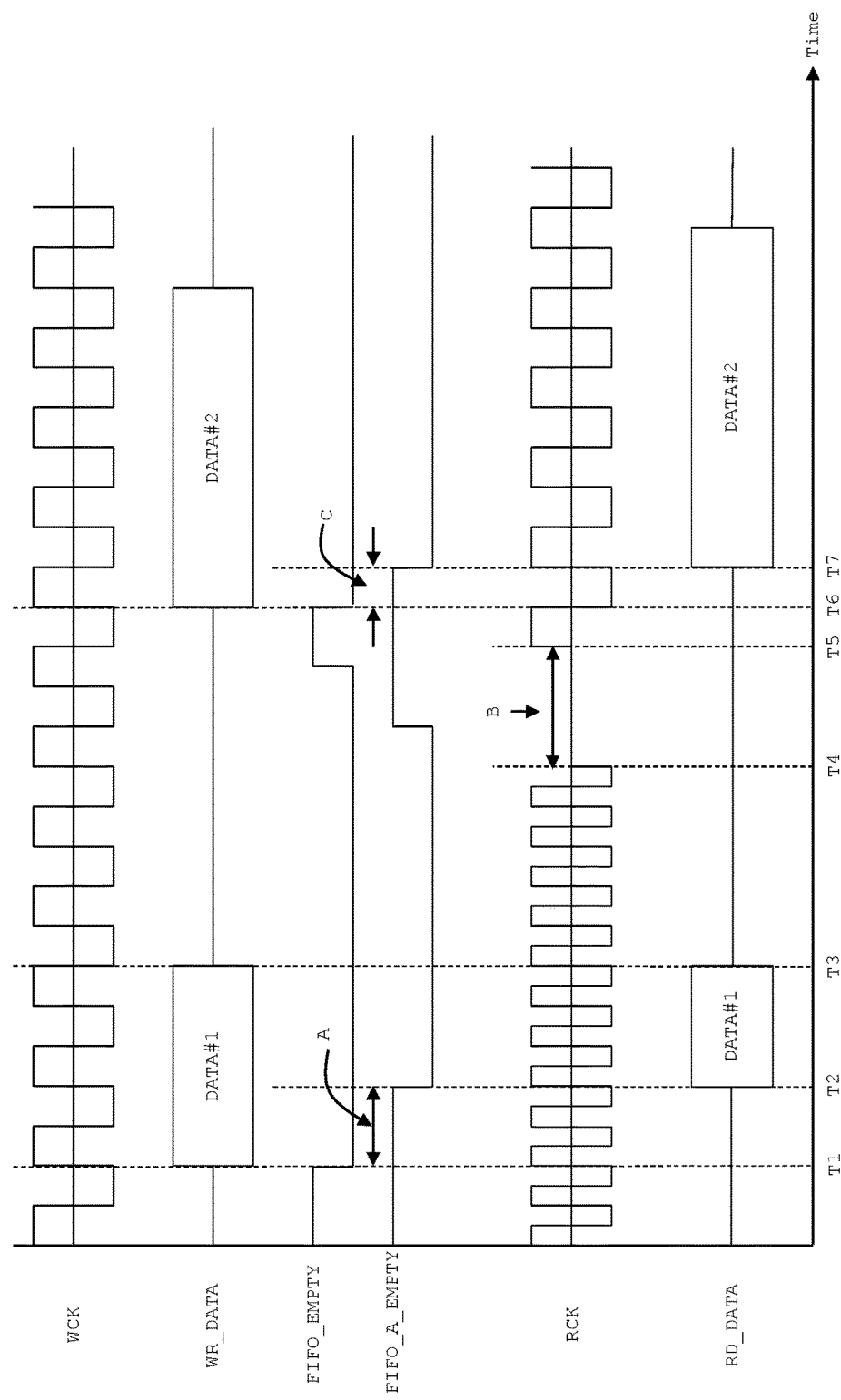
FIG. 4 shows illustrative waveforms for various signals transmitted through a FIFO circuit in accordance with one embodiment of the present invention.

FIG. 4, meant to be illustrative and not limiting, illustrates waveforms of selected signals applicable to a FIFO circuit in accordance with one embodiment of the present invention. In one embodiment, the FIFO circuit may be similar to FIFO circuit 300 of FIG. 3. Therefore, the WCK, RCK, WR_DATA, RD_DATA, FIFO_EMPTY, and FIFO_A_EMPTY signals of FIG. 4 may be similar to the respective WCK, RCK, WR_DATA, RD_DATA, FIFO_EMPTY, and FIFO_A_EMPTY signals of FIG. 3.

As shown in the embodiment of FIG. 4, the WCK signal may have a lower frequency value compared to the RCK signal prior to time T4. In an embodiment, the RCK signal may be following a clock frequency value of the PCI Express link whereas the WCK signal may be following the clock frequency value of an operating frequency of the core logic (e.g., core logic 110 of FIG. 1 or core logic 260 of FIG. 2).

Referring still to FIG. 4, a first group of data (DATA#1) is received starting from time T1 as indicated on the WR_DATA signals. In one embodiment, the DATA#1 may be transmitted from the core logic. At the same time (i.e., T1), the write pointer indicated by the W_PG signals (not shown in this embodiment) may be increased to indicate that data in signals WR_DATA is being stored in the FIFO circuit. The W_PG signals may be similar to the W_PG signals described in FIG. 3, in one embodiment.

In response to the write pointer increasing above the read pointer, the FIFO circuit (e.g., FIFO circuit 300) de-asserts the FIFO_EMPTY signal from a logic high value to a logic low value. This de-assertion occurs because the FIFO circuit is no longer empty once a portion of the DATA#1 is stored into the FIFO circuit that has not yet been read from the FIFO circuit.

The remaining portions of DATA#1 continue to be received and stored in the FIFO circuit until time T3. At time T2, the difference between the write pointer and the read pointer increases above the empty threshold limit value of the FIFO circuit. In one embodiment, the empty threshold limit value of the FIFO circuit may be similar to the empty threshold limit value of FIFO circuit 300 indicated by signals A_EMPTY_LIMIT and described in FIG. 3. The empty threshold limit value of the FIFO circuit may be generated by a FIFO empty logic circuit (e.g., FIFO empty logic 340 of FIG. 3). In response to the difference between the write and read pointers being above the empty threshold limit value of the FIFO circuit, the FIFO circuit (e.g., FIFO circuit 300) de-asserts the FIFO_A_EMPTY signal from a logic high value to a logic low value. Between times T1 and T2 (time period marked by "A" in FIG. 4), portions of DATA#1 are continuously stored within the FIFO circuit without any transmission out from the FIFO circuit as the RD_DATA signals. It is only after time T2 that the stored DATA#1 is transmitted out as the RD_DATA signals.

At time T3, DATA#1 is completely received and stored in the FIFO circuit through the WR_DATA signals, and DATA#1 is also completely transmitted out of the FIFO circuit through the RD_DATA signals. It should be appreciated that the DATA#1 requires three clock cycles to be received and to be transmitted out of the FIFO circuit. However, as shown in the embodiment of FIG. 4, the period to receive and store the DATA#1 as indicated on the WR_DATA signals (i.e., the period between T1 and T3) is greater than the period to transmit the DATA#1 as indicated on the RD_DATA signals (i.e., the period between T2 and T3). This is due to the clock frequency value of the RCK signal being larger than the clock frequency value of the WCK signal.

At time T4, the link speed (e.g., the data rate of data transmitted through the PCI Express link) is renegotiated. The renegotiation happens due to different requirements imposed by external circuitry on the PCI Express link. During the renegotiation, the clock frequency value of the RCK signal may change. In the embodiment of FIG. 4, the clock frequency value of the RCK signal subsequent to time T5 may become slower than the clock frequency value of the RCK signal prior to time T4, as can be seen from the periods of the RCK signal in FIG. 4. Alternatively, the clock frequency value of the RCK signal subsequent to time T5 may become faster (not shown) than the clock frequency value of the RCK signal prior to time T4.

During the time period between times T4 and T5 (marked by "B" in FIG. 4), the FIFO circuit is placed in a recovery mode. The recovery mode enables the FIFO circuit to identify the new speed (e.g., data rate) that is required by the link. It should be appreciated that the time period between T4 and T5 may also be referred to as a "clock switching dead period," because between times T4 and T5, no data is transmitted out of the FIFO circuit through the RD_DATA signals, no data is stored in the FIFO circuit through the WR_DATA signals, and clock signal RCK is not oscillating. The empty threshold limit value can be changed during the recovery mode without losing or corrupting any of the data, because data is not transmitted into or out of the FIFO circuit during the recovery mode.

In this embodiment, the read pointer indicated by the R_PG signals is set to a first address of the FIFO circuit given that DATA#1 is fully transmitted out of the FIFO circuit as the RD_DATA signals. However, when renegotiation happens, the read pointer may be generally frozen to the last stopped destination. In addition, during the period marked by "B" in FIG. 4, a new empty threshold limit value of the FIFO circuit is generated. In one embodiment, the new empty threshold limit value of the FIFO circuit may be generated by FIFO empty logic (e.g., FIFO empty logic 340 of FIG. 3). As described in the embodiment of FIG. 3, the empty threshold limit value of the FIFO circuit is changed to a larger value than the initial empty threshold limit value in response to the clock frequency value of the RCK signal being greater than its initial clock frequency value. Alternatively, the empty threshold limit value of the FIFO circuit is changed to a smaller value than the initial empty threshold limit value in response to the clock frequency value of the RCK signal being smaller than its initial clock frequency value.

At time T5, the clock frequency value of the RCK signal is changed to a smaller frequency value than prior to time T4, and the empty threshold limit value of the FIFO circuit is changed to a smaller value. In addition, the FIFO_EMPTY and FIFO_A_EMPTY signals are each re-asserted to a logic value high from a logic value low during time period B as shown in FIG. 4.

At time T6, a second group of data DATA#2 begins to be received at the FIFO circuit as the WR_DATA signals and stored in the FIFO circuit. Similar to the DATA#1, the DATA#2 may be received from the core logic. At the same time, the write pointer indicated by the W_PG signals increases. In response to the value of the write pointer increasing above the value of the read pointer, the FIFO_EMPTY signal is de-asserted from a high logic value to a low logic value, as the FIFO circuit is no longer empty.

The remaining portion of the DATA#2 is continuously received and stored in the FIFO circuit subsequent to time T6. However, at time T7, the difference between the values of the write and the read pointers increases above the new empty threshold limit value of the FIFO circuit. In response to the difference between the write and read pointers exceeding the new empty threshold limit value of the FIFO circuit, the FIFO circuit de-asserts the FIFO_A_EMPTY signal from a logic high value to a logic low value at time T7. During the time period from time T6 to time T7 (as marked by "C" in FIG. 4), the DATA#2 may be continuously stored within the FIFO circuit. It is only after time T7 that the DATA#2 are transmitted out as the RD_DATA signals.

As shown in the embodiment of FIG. 4, the time period marked by "C" is significantly shorter than the time period marked by "A". The shorter time period "C" occurs as a result of a smaller new empty threshold limit value of the FIFO circuit. However, if the previous empty threshold limit value of the FIFO circuit was utilized (i.e., no new empty threshold limit value was generated and applied to the FIFO circuit), the transmission of DATA#2 out of the FIFO circuit might begin at a much later time than time T7, which would cause a longer idle period before DATA#2 is transmitted as the RD_DATA signals.

Figure 5:
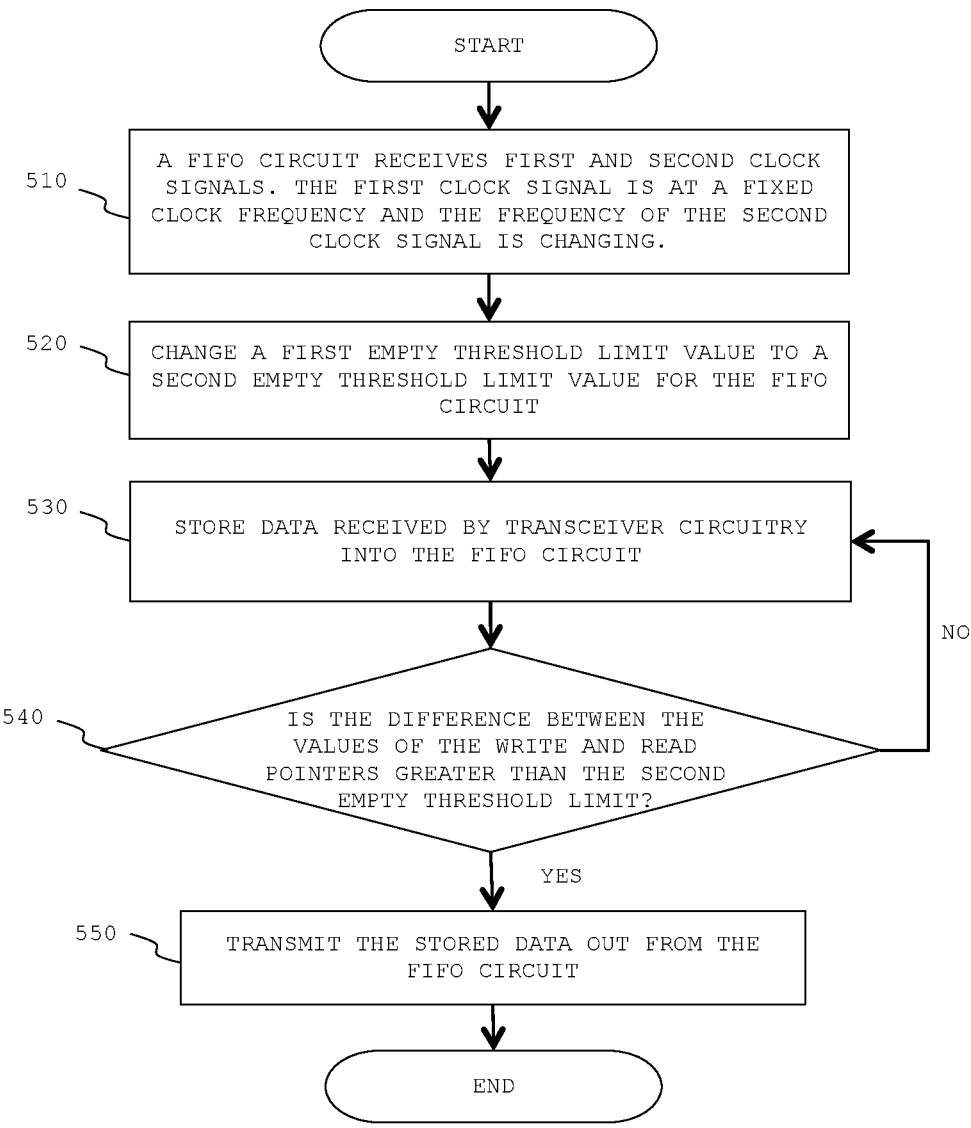
FIG. 5 shows a flowchart of an illustrative method of transmitting data signals through transceiver circuitry in accordance with one embodiment of the present invention.

FIG. 5, meant to be illustrative and not limiting, illustrates a flowchart on a method of transmitting data through transceiver circuitry in accordance with one embodiment of the present invention. The transceiver circuitry may be similar to transceiver circuitry 130 of FIG. 1 and the data may be similar to the data transmitted as the WR_DATA/RD_DATA signals of FIGS. 3 and 4. In one embodiment, the transceiver circuitry may include circuitry adapted to transmit data according to the PCI Express protocol.

At step 510, a FIFO circuit receives first and second clock signals. In one embodiment, the FIFO circuit may be similar to FIFO circuit 300 of FIG. 3. The first clock signal is at a fixed clock frequency. In one embodiment, the first clock signal may be the WCK signal of FIGS. 3 and 4. The second clock signal changes from one clock frequency value to another clock frequency value. In one embodiment, the second clock signal may be the RCK signal of FIGS. 3 and 4. The frequency of the second clock signal may change depending on the link that couples the transceiver circuitry and external circuitry. In one exemplary embodiment, the second clock signal changes its clock frequency to a higher frequency value than its initial frequency value. Alternatively, the second clock signal may change its clock frequency to a lower frequency value than its initial frequency value.

At step 520, a first empty threshold limit value is changed to a second empty threshold limit value. The first and second empty threshold limit values are for the FIFO circuit. In one embodiment, the first empty threshold limit value may be based on the initial frequency value of the second clock signal. In response to the second clock signal changing its frequency value to a value other than the initial frequency value, a control circuit (e.g., FIFO empty logic 340 of FIG. 3) generates the second empty threshold limit value. The second empty threshold limit value depends on the new frequency value of the second clock signal. In one embodiment, the second empty threshold limit value increases when the new frequency value of the second clock signal is greater than the initial frequency value. Alternatively, the second empty threshold limit value decreases when the new frequency value of the second clock signal is lower than the initial frequency value.

At step 530, the data received from the core circuitry by the transceiver circuitry are stored in the FIFO circuit. In one embodiment, the core circuitry may be similar to core logic 110 of FIG. 1 or core logic 260 of FIG. 2. The data may be transmitted as the WR_DATA signals of FIGS. 3 and 4. In one embodiment, the data may be similar to DATA#1 or DATA#2 of FIG. 4. The data may be stored within storage circuits (e.g., storage circuit 310 of FIG. 3) of the FIFO circuit. As the number of storage locations of the FIFO circuit that store data increases, the write pointer increases.

At step 540, a determination is made as to whether the difference between the value of the write pointer and the value of the read pointer is greater than the second empty threshold limit. In one embodiment, the determination may be performed by comparing the difference between the values of the write and read pointers to the second empty threshold limit. If the difference between the values of the write and read pointers is greater than the second empty threshold limit, then the method proceeds to step 550. However, if the difference between the values of the write and read pointers is less than the second empty threshold limit, the method loops back to step 530 to store more data into the FIFO circuit and continues to increase the write pointer in response to data being stored in each additional storage location in the FIFO circuit.

At step 550, the stored data are transmitted out of the FIFO circuit. In one embodiment, the stored data are transmitted as the RD_DATA signals. The stored data may be transmitted in a sequential manner as they were stored (hence, the concept of first-in-first-out). It should be appreciated that when the stored data are transmitted out of the FIFO circuit, new data received from the core circuitry may be concurrently stored within the FIFO circuit.

Figure 6:
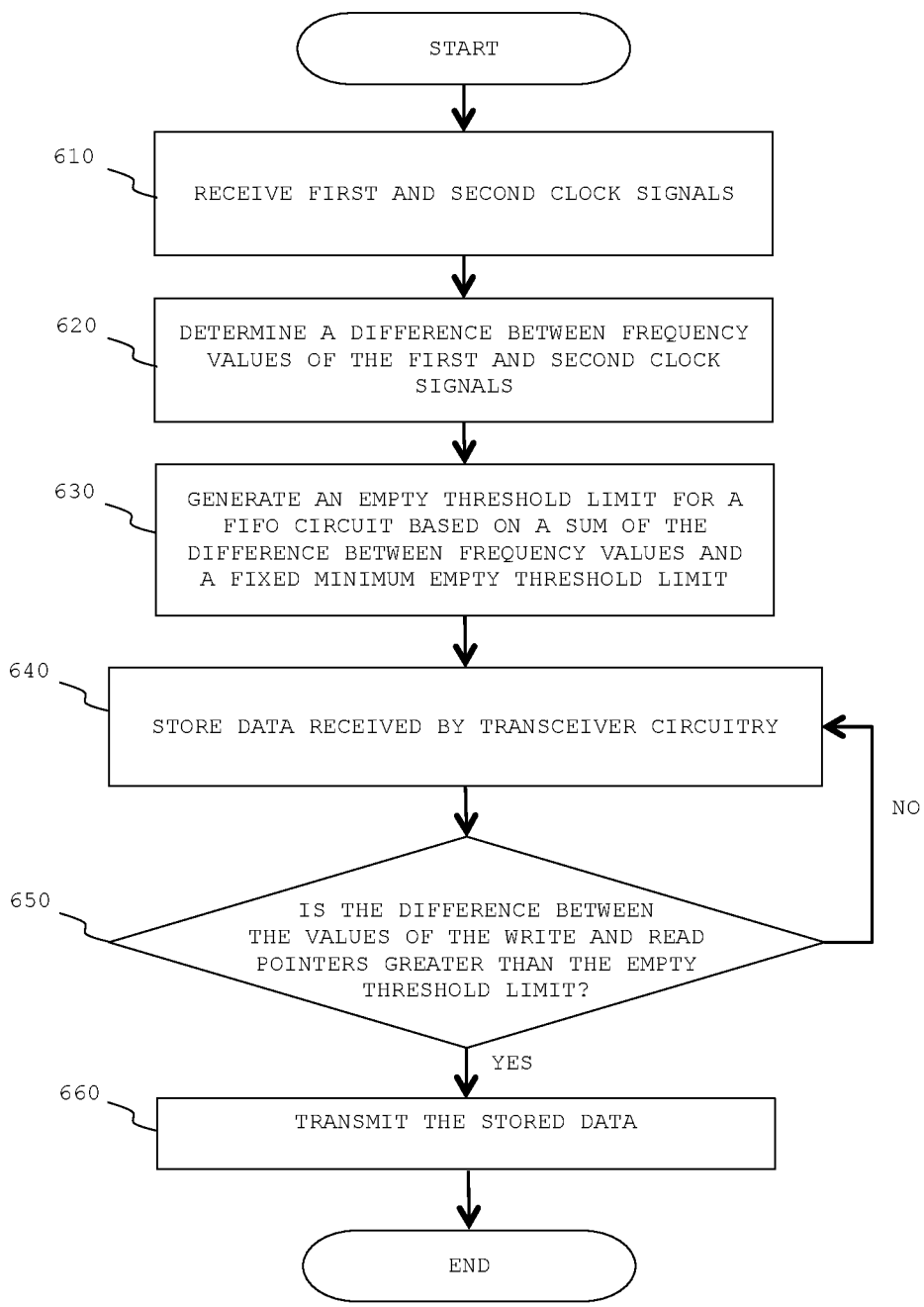
FIG. 6 shows another flowchart of an illustrative method for the transmission of data signals through transceiver circuitry in accordance with one embodiment of the present invention.

FIG. 6, meant to be illustrative and not limiting, illustrates another flowchart of a method to transmit data through transceiver circuitry in accordance with one embodiment of the present invention. Similar to FIG. 5, the transceiver circuitry may be similar to transceiver circuitry 130 of FIG. 1 and the data may be transmitted as the WR_DATA/RD_DATA signals of FIGS. 3 and 4.

At step 610, a FIFO circuit receives first and second clock signals. Similar to FIG. 5, the FIFO circuit may be similar to FIFO circuit 230 of FIG. 2 and/or FIFO circuit 300 of FIG. 3. The first and second clock signals may be similar to the WCK and RCK signals, respectively, of FIGS. 3 and 4. The first clock signal is at a first clock frequency value. Generally, the first clock signal may be provided by core circuitry (e.g., core logic 110 of FIG. 1 or core logic 260 of FIG. 2) and is at a fixed frequency value. The second clock signal is at a second clock frequency value. The frequency of the second clock signal may change in response to a change in the data rate of the data transmitted through a PCI Express link that couples the transceiver circuitry and external circuitry, similar to the second clock signal of FIG. 5.

At step 620, a difference between the frequency values of the first and second clock signals are determined. The difference between the frequency values is significantly larger when the second clock frequency value is significantly greater than the first clock frequency value. Alternatively, the difference between the frequency values may be significantly smaller or non-existent when the second clock frequency value is only slightly greater or is equal to the first clock frequency value. For example, in FIG. 4, the difference between the clock frequencies of the WCK and RCK signals is larger prior to time T3 than the difference between the clock frequencies of the WCK and RCK signals after time T5.

At step 630, an empty threshold limit for a FIFO circuit is generated. In one embodiment, the empty threshold limit is based on a summation of a difference between the first and second clock frequency values and a fixed minimum empty threshold limit. In one embodiment, the fixed minimum empty threshold limit may be a delay for a pointer synchronization period. Hence, when the difference between the first and second frequency values is large, a large empty threshold limit is generated. A large empty threshold limit value is shown by virtue of a large period between de-assertion of the FIFO_EMPTY signal and de-assertion of the FIFO_A_EMPTY signal (e.g., the period marked by "A" in FIG. 4). Whereas, when the difference between the first and second frequency values is small, a small empty threshold limit is generated. A small empty threshold limit value is shown by virtue of a small period between de-assertion of the FIFO_EMPTY signal and de-assertion of the FIFO_A_EMPTY signal (e.g., marked by the period "C" in FIG. 4).

Once the empty threshold limit is generated, the method proceeds to steps 640-660. In one embodiment, the steps 640-660 may be similar to or the same as steps 530-550, respectively, of FIG. 5. Therefore, for the sake of brevity, these steps will not be repeated.

The embodiments thus far have been described with respect to integrated circuits. The methods and apparatuses described herein may be incorporated into any suitable circuit. For example, they may be incorporated into numerous types of devices such as programmable logic devices, application specific standard products (ASSPs), and application specific integrated circuits (ASICs). Examples of programmable logic devices include programmable arrays logic (PALs), programmable logic arrays (PLAs), field programmable logic arrays (FPGAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The programmable logic device described in one or more embodiments herein may be part of a data processing system that includes one or more of the following components: a processor; memory; IO circuitry; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the families of devices owned by ALTERA Corporation.

Although the methods of operations were described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

Although the foregoing invention has been described in some detail for the purpose of clarity, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. Transceiver circuitry, comprising:
   a first-in-first-out (FIFO) circuit that stores data received based on a first clock frequency value and outputs the stored data based on a second clock frequency value, wherein the FIFO circuit provides the stored data at an output only in response to a difference between a write address indicated by a write pointer of the FIFO circuit and a read address indicated by a read pointer of the FIFO circuit being greater than an empty threshold limit value of the FIFO circuit; and
   a control circuit that changes the empty threshold limit value of the FIFO circuit to a new empty threshold limit value and that provides the new empty threshold limit value to the FIFO circuit.

2. The transceiver circuitry as defined in claim 1, wherein the FIFO circuit is an asynchronous FIFO circuit.

3. The transceiver circuitry as defined in claim 1, wherein the empty threshold limit value is changed in response to changes to the second clock frequency value.

4. The transceiver circuitry as defined in claim 3, wherein the control circuit increases the empty threshold limit value when the second clock frequency value is increased to a value higher than an original frequency value.

5. The transceiver circuitry as defined in claim 3, wherein the control circuit decreases the empty threshold limit value when the second clock frequency value is decreased to a value lower than an original frequency value.

6. The transceiver circuitry as defined in claim 1, wherein a size of the FIFO circuit is greater than 32 kilobytes (Kbytes).

7. The transceiver circuitry as defined in claim 1, wherein the transceiver circuitry is part of a field programmable gate array (FPGA) device.

8. The transceiver circuitry as defined in claim 7, wherein the data are received from core logic circuitry within the FPGA device and the stored data are transmitted out to an external device coupled to the transceiver circuitry.

9. A method of transmitting data using transceiver circuitry, the method comprising:
   receiving first and second clock signals at a first-in-first-out (FIFO) circuit having a first empty threshold limit value, wherein the first clock signal is at a fixed clock frequency value; and
   using a control circuit, changing the first empty threshold limit value of the FIFO circuit to a second empty threshold limit value in response to the second clock signal changing from a first clock frequency value to a second clock frequency value, wherein the first clock frequency value is different than the second clock frequency value.

10. The method as defined in claim 9, wherein the second clock frequency value is larger than the first clock frequency value and the second empty threshold limit value is larger than the first empty threshold limit value.

11. The method as defined in claim 9, wherein the second clock frequency value is smaller than the first clock frequency value and the second empty threshold limit value is smaller than the first empty threshold limit value.

12. The method as defined in claim 9, further comprising:
   storing the data received by the transceiver circuitry in the FIFO circuit; and
   transmitting the stored data out of the FIFO circuit only in response to a difference between a write address indicated by a write pointer of the FIFO circuit and a read address indicated by a read pointer of the FIFO circuit exceeding the second empty threshold limit value.

13. The method as defined in claim 9, further comprising:
   using the first-in-first-out (FIFO) circuit having the second empty threshold limit value, changing the second clock signal from the second clock frequency value to a third clock frequency value; and
   using the control circuit, changing from the second empty threshold limit value of the FIFO circuit to a third empty threshold limit value in response to the second clock signal changing to the third clock frequency value.

14. The method as defined in claim 13, further comprising:
   storing the data received by the transceiver circuitry in the FIFO circuit; and
   transmitting the stored data out of the FIFO circuit only in response to a difference between a write address indicated by a write pointer of the FIFO circuit and a read address indicated by a read pointer of the FIFO circuit exceeding the third empty threshold limit value.

15. A method of transmitting data through transceiver circuitry to external circuitry, the method comprising:
   receiving first and second clock signals at a first-in-first-out (FIFO) circuit having a first empty threshold limit value, wherein the first clock signal is at a first clock frequency value, and the second clock signal is at a second clock frequency value; and using a control circuit, generating a second empty threshold limit value for the FIFO circuit based on a difference between the first clock frequency value and the second clock frequency value.

16. The method as defined in claim 15, further comprising:

using the control circuit, generating the second empty threshold limit value that is linearly proportional to the difference between the first clock frequency value and the second clock frequency value.

17. The method as defined in claim 15, further comprising:

using the control circuit, generating a fixed minimum empty threshold limit for the FIFO circuit when the second clock frequency value is identical to the first clock frequency value.

18. The method as defined in claim 15, wherein the transceiver circuitry is coupled to a field programmable gate array (FPGA), and the first clock signal and the data are received from core logic circuitry of the FPGA.

19. The method as defined in claim 18, further comprising:

storing the data received from the core logic circuitry in the FIFO circuit.

20. The method as defined in claim 19, further comprising:

using the FIFO circuit, transmitting the stored data out of the transceiver circuitry only in response to a difference between a write address indicated by a write pointer of the FIFO circuit and a read address indicated by a read pointer of the FIFO circuit exceeding the second empty threshold limit value.

* * * * *